United States Patent
Milne et al.

(10) Patent No.: US 12,407,404 B2
(45) Date of Patent: Sep. 2, 2025

(54) WIRELESS DEVICE ACTIVATION TRACKING OF A WIRELESS SATELLITE SERVICE

(71) Applicant: Skylo Technologies, Inc., Palo Alto, CA (US)

(72) Inventors: Ian Milne, Burlingame, CA (US); Prasanna Venkatesan Srinivasan Iyengar, Bengaluru (IN); Birender Panwar, Bangalor (IN); Prem Shankar, Bengaluru (IN); Vijay Lewis, Wylie, TX (US); Andrew Nuttall, Mountain View, CA (US); Meghna Agrawal, Cupertino, CA (US); Anand Radhakrishnan, Espoo (FI)

(73) Assignee: Skylo Technologies, Inc., Palo Alto, CA (US)

( * ) Notice: Subject to any disclaimer, the term of this patent is extended or adjusted under 35 U.S.C. 154(b) by 417 days.

(21) Appl. No.: 17/990,798

(22) Filed: Nov. 21, 2022

(65) Prior Publication Data
US 2024/0171260 A1 May 23, 2024

(51) Int. Cl.
*H04B 7/185* (2006.01)
*H04W 60/00* (2009.01)

(52) U.S. Cl.
CPC ........ *H04B 7/18513* (2013.01); *H04W 60/00* (2013.01)

(58) Field of Classification Search
CPC . H04W 84/06; H04B 7/18513; H04B 7/1851; H04B 7/18521
See application file for complete search history.

(56) References Cited

U.S. PATENT DOCUMENTS

| | | | |
|---|---|---|---|
| 5,717,830 A | 2/1998 | Sigler et al. | |
| 5,748,742 A | 5/1998 | Tisdale et al. | |
| 7,324,469 B2 | 1/2008 | Wilson | |
| 9,319,957 B1* | 4/2016 | Singh | H04W 36/304 |
| 2016/0344709 A1* | 11/2016 | Sadhasivan | G09C 1/00 |
| 2017/0331577 A1* | 11/2017 | Parkvall | H04L 27/2602 |
| 2017/0331670 A1* | 11/2017 | Parkvall | H04J 11/0059 |
| 2018/0146402 A1* | 5/2018 | Seo | H04W 28/0247 |
| 2021/0368395 A1* | 11/2021 | Prabhakar | H04W 28/22 |

FOREIGN PATENT DOCUMENTS

CA 2089116 C * 4/2003 ........... G01S 5/0009

* cited by examiner

*Primary Examiner* — Khalid W Shaheed
(74) *Attorney, Agent, or Firm* — Brian Short (57) ABSTRACT

Apparatuses, methods, and systems for operating a wireless satellite service are disclosed. One method includes maintaining, by a satellite service server, a database of an activation status of each of a plurality of subscriber devices as provided by a plurality of terrestrial service providers, receiving, by a satellite network, a request from a wireless device to access the wireless satellite service through a satellite link, wherein the satellite network is electronically connected to the satellite service server, querying, by the satellite network, the satellite service server to confirm whether the wireless device requesting access to the wireless satellite service is a subscriber device that is activated, providing, by the satellite service server, the activation status of the wireless device to the satellite network, and performing, by the satellite network, a wireless device attachment process with a one of the plurality terrestrial service providers based upon the activation status.

20 Claims, 10 Drawing Sheets

Database entries per IMSI:

*IMSI
*IMEI
*Activation status and Quota/Plan definition
*Time when device was activated'
*Last terrestrial connection time
*Last satellite connection time
*Location of the device
*Device's temporary identifier
*Device RRC connection and attach and security context
*Satellite network usage statistics ( # of msgs , msg size,
*Frequency, UL /DL data transfer statistics)
*Terrestrial to satellite roaming events
*Connection attempts and frequency while in deactivated state

Maintaining, by a satellite service server, a database of an activation status of each of a plurality of subscriber devices as provided by a plurality of terrestrial service providers
1010

Receiving, by a satellite network, a request from a wireless device to access the wireless satellite service through a satellite link, wherein the satellite network is electronically connected to the satellite service server
1020

Querying, by the satellite network, the satellite service server to confirm whether the wireless device requesting access to the wireless satellite service is a subscriber device that is activated
1030

Providing, by the satellite service server, the activation status of the wireless device to the satellite network
1040

Performing, by the satellite network, a wireless device attachment process with a one of the plurality terrestrial service providers based upon the activation status
1050

WIRELESS DEVICE ACTIVATION TRACKING OF A WIRELESS SATELLITE SERVICE

FIELD OF THE DESCRIBED EMBODIMENTS

The described embodiments relate generally to wireless communications. More particularly, the described embodiments relate to systems, methods, and apparatuses for wireless device activation tracking of a wireless satellite service.

BACKGROUND

Satellite networks operate to cover large areas and can have a large number of users. Further, only limited amounts of spectral resources are allocated to satellite networks. Accordingly, satellite networks should be selective in allowing user access to the satellite networks.

It is desirable to have methods, apparatuses, and systems for wireless device activation tracking of a wireless satellite service.

SUMMARY

An embodiment includes a method of operating a wireless satellite service. The method includes maintaining, by a satellite service server, a database of an activation status of each of a plurality of subscriber devices as provided by a plurality of terrestrial service providers, receiving, by a satellite network, a request from a wireless device to access the wireless satellite service through a satellite link, wherein the satellite network is electronically connected to the satellite service server, querying, by the satellite network, the satellite service server to confirm whether the wireless device requesting access to the wireless satellite service is a subscriber device that is activated, providing, by the satellite service server, the activation status of the wireless device to the satellite network, and performing, by the satellite network, a wireless device attachment process with a one of the plurality terrestrial service providers based upon the activation status.

Another embodiment includes a satellite system. The system includes a satellite network, and a satellite service server electronically connected to the satellite network. The satellite service server is configured to maintain a database of an activation status of each of a plurality of subscriber devices as provided by a plurality of terrestrial service providers. The satellite network is configured to receive a request from a wireless device to access the wireless satellite service through a satellite link, wherein the satellite network is electronically connected to the satellite service server and query the satellite service server to confirm whether the wireless device requesting access to the wireless satellite service is a subscriber device that is activated. The satellite service server is further configured to provide the activation status of the wireless device to the satellite network, and the satellite network is further configured to perform a wireless device attachment process with a one of the plurality terrestrial service providers based upon the activation status.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for wireless device activation tracking of a wireless satellite service.

Figure 1:
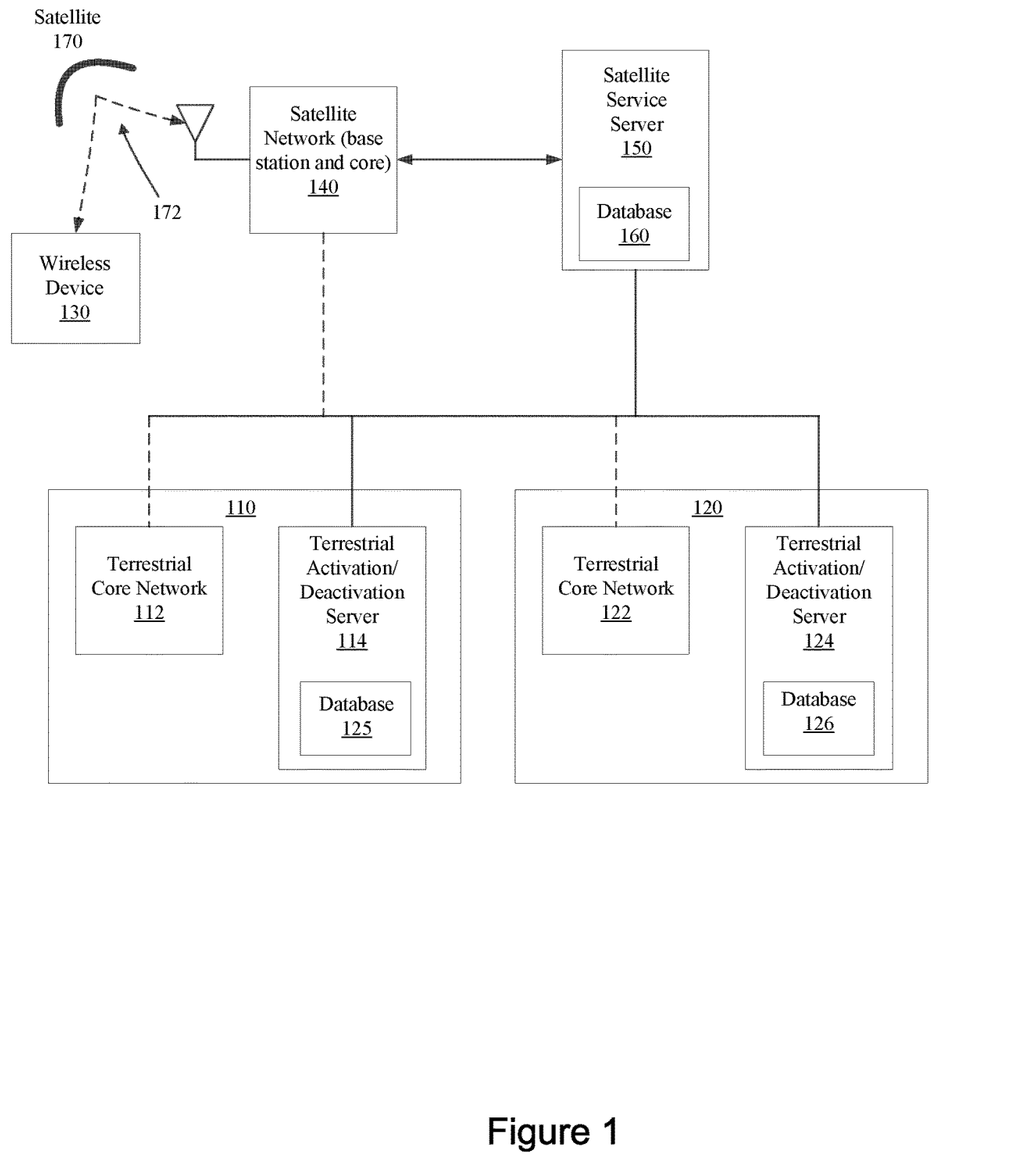
FIG. 1 shows a satellite network interfaced with a plurality of terrestrial service providers, according to an embodiment.

FIG. 1 shows a satellite network 140 interfaced with a plurality of terrestrial service providers 110, 120, according to an embodiment. For an embodiment, a satellite service server 150 is configured to maintain a database 160 of an activation status of each of a plurality of subscriber devices as provided by the plurality of terrestrial service providers 110, 120. The terrestrial service providers 110, 120 maintain databases 125, 126 that include customer information.

For an embodiment, the satellite network 140 is configured to receive a request from a wireless device 130 to access the wireless satellite service 150 through a satellite link 172 supported by a satellite 170. As shown, the satellite network 140 is electronically connected to the satellite service server 150. Further, the satellite network 140 and the wireless satellite service 150 are electronically connected to the plurality of terrestrial service providers 110, 120.

For an embodiment, the satellite network 140 is further configured to query the satellite service server 150 to confirm whether the wireless device 130 requesting access to the wireless satellite service is a subscriber device that is activated per the database 160.

For an embodiment, the satellite service server 150 is configured to provide the activation status of the wireless device 150 to the satellite network 140 in response to the query. For an embodiment, the activation status of the wireless device 130 is active or non-active.

For an embodiment, the satellite network 140 is further configured to perform a wireless device 130 attachment process when the activation status indicates the wireless device 130 is determined to be active. For an embodiment, this includes the satellite network 140 performing the wireless device 130 attachment process with a one of the plurality terrestrial service providers 110, 120 based upon the active status.

It is to be understood that the satellite link 172 is a scarce resource. That is, there is only a limited amount of frequency spectrum allocated for use by the satellite link 172. Accordingly, it can be desirable to only let devices of paid customers (subscribers) to access the wireless satellite service. For an embodiment, customers may purchase the subscription of the wireless satellite service as insurance in case needed but may not be needed. For an embodiment, wireless devices of non-prepaid users (non-customers) are not allowed to have access to the wireless satellite service.

For an embodiment, the wireless device 130 attachment process refers to satellite network 140 attachment which includes authentication, security, device capability, and configuration message exchange between the wireless device 130 and the satellite network 140. For an embodiment, when the wireless device roams to the satellite network 140, the satellite network 140 authenticates with at least one of the terrestrial networks 110, 120.

For an embodiment, a subscriber device activation process includes checking the device's billing, registration and certification status (can include more checks) of the subscriber device and determining whether the subscriber device is allowed to access the network or not.

For an embodiment, each terrestrial network 110, 120 includes a terrestrial core network 112, 122, and a terrestrial activation/deactivation server 114, 124. For an embodiment, the terrestrial core networks 112, 122 each routes traffic within the terrestrial network and controls access to the terrestrial network. For an embodiment, the terrestrial activation/deactivation servers 114, 124 each maintains the activation status of devices belonging to the terrestrial network.

For an embodiment, the satellite network 140 includes a base station and a core network. For an embodiment, the base station is configured to receive the request from the wireless device 130 to access the wireless satellite service 150 through the satellite link 172. For an embodiment, the core network is configured to route traffic and control access of wireless devices to the satellite network.

For an embodiment, the satellite network 140 is operated by Company A which maintains the satellite service server 150. For an embodiment, a terrestrial network (such as, terrestrial networks 110, 120) is operated by Company B which maintains a database (125, 126) of devices activated/unactivated on a service of company A. Company A also gets the activated/unactivated devices information and maintains it in its own database 160. For an embodiment, company A and company B ensure that the database 160 of Company A has the most recent information using information push and pull mechanisms (that is, the satellite service server 150 of company A pulls the information or the terrestrial network or company B pushes the information to the satellite service server 150). When a wireless device 130 tries to connect to the satellite network of company A, the satellite network 140 of company A first checks in its own database 160 before authenticating with the terrestrial network of company B. If the wireless device 130 is not activated based on the database 160 company A, then the satellite network 140 of company A doesn't go for a full authentication process (wherein full authentication process includes connecting with the terrestrial network of company B, checking the activation status from the database of the terrestrial network of company B, verifying and exchanging the security keys) with the terrestrial network of company B. Instead, the satellite network 140 of company A can directly reject the request to connect by the wireless device 130. The described process here is valuable for satellite network, as the satellite network has limited bandwidth and the process described here helps in reducing the number of messages transmitted through satellite network, and therefore improves satellite network capacity. In other words, the embodiments described improve the satellite network by reducing the network attachment process overhead and also reduces latency.

Existing networks perform the full authentication process with the terrestrial network of company B for every wireless device that tries to connect to the satellite network without checking their own database (since they don't maintain their own database). This increases overhead on the satellite network as the wireless devices which are not allowed (to use company A's service) also go through the full authentication process with the terrestrial network of company B via satellite network which is a scarce resource.

For at least some of the described embodiments, the terrestrial network of company A provides appropriate rejection codes to the wireless devices and forces the wireless devices to reduce future connection attempt, and thereby further save resources (time and frequency spectrum) of the satellite network.

Figure 2:
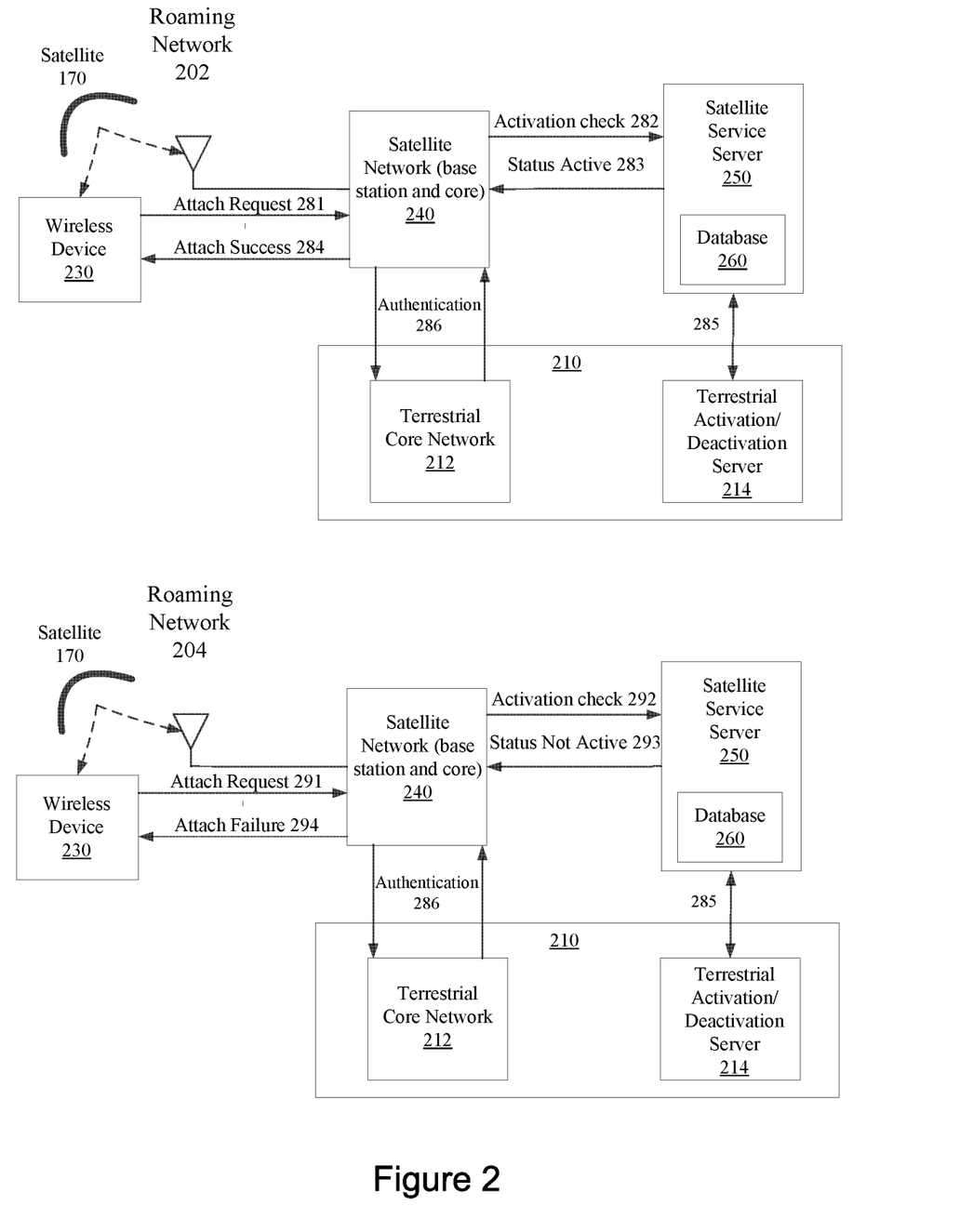
FIG. 2 shows a satellite network in which a wireless device successfully attaches to the satellite network, and when the wireless device is not able to attach to the satellite network, according to an embodiment.

FIG. 2 shows a satellite network in which a wireless device 230 successfully attaches (roaming network 202) to the satellite network, and when the wireless device is not able to attach (roaming network 204) to the satellite network, according to an embodiment. A first sequence of actions of the roaming network 202 of a wireless device 230 roaming and connecting to the satellite network 240 includes the wireless device 230 requesting access (attach request) 281 to the satellite network 240. The first sequence of actions 202 further includes the satellite network 240 checking the activation status 282 which includes querying the satellite service server 250 to confirm whether the wireless device 230 requesting access to the wireless satellite service is a subscriber device that is activate as stored in a database 260 of the satellite network 240. If the activation status query is a success (wireless device 230 is a subscriber device), the activation check results in a status active 283 being sent back to the satellite network 240. Upon receiving the successful status active, the satellite network 140 is further configured to perform a wireless device 130 attachment success process 284. That is, the satellite network 140 performs the wireless device 230 attachment process with the one of the plurality terrestrial service providers based upon the active status.

For an embodiment, at least one terrestrial network 210 includes a server 214 that maintains the activation statuses of the subscriber devices. The activation statuses of the subscriber devices are stored in the database 260 of the satellite service server 250 and provided 285 to the satellite service server 250. Further, a terrestrial core network 212 of the terrestrial network 210 maintains and provides 286 authentication information to the satellite network 240.

A second sequence of actions (roaming network 204) of a wireless device 230 attempting to roam and connect to the satellite network 240 of the satellite network 240 includes a wireless device 230 requesting access (attach request) 291 to the satellite network 240. The second sequence of actions further includes the satellite network 240 checking the activation status 292 which includes querying the satellite service server 250 to confirm whether the wireless device 230 requesting access to the wireless satellite service is a subscriber device that is activated. If the activation status query is a failure (subscriber device not activated), the activation check results in a status not active 293 being sent back to the satellite network 240. Upon receiving the status not active 293, the satellite network 140 is further configured to fail the attachment success process 294. For an embodiment, the authentication 286 with the terrestrial network 210 does not occur when receiving the status not active 293.

A shown, the terrestrial activation/deactivation server 214 of the terrestrial network 210 provides the activation status 285 to the satellite service server 250 which is stored in the database 260.

Figure 3:
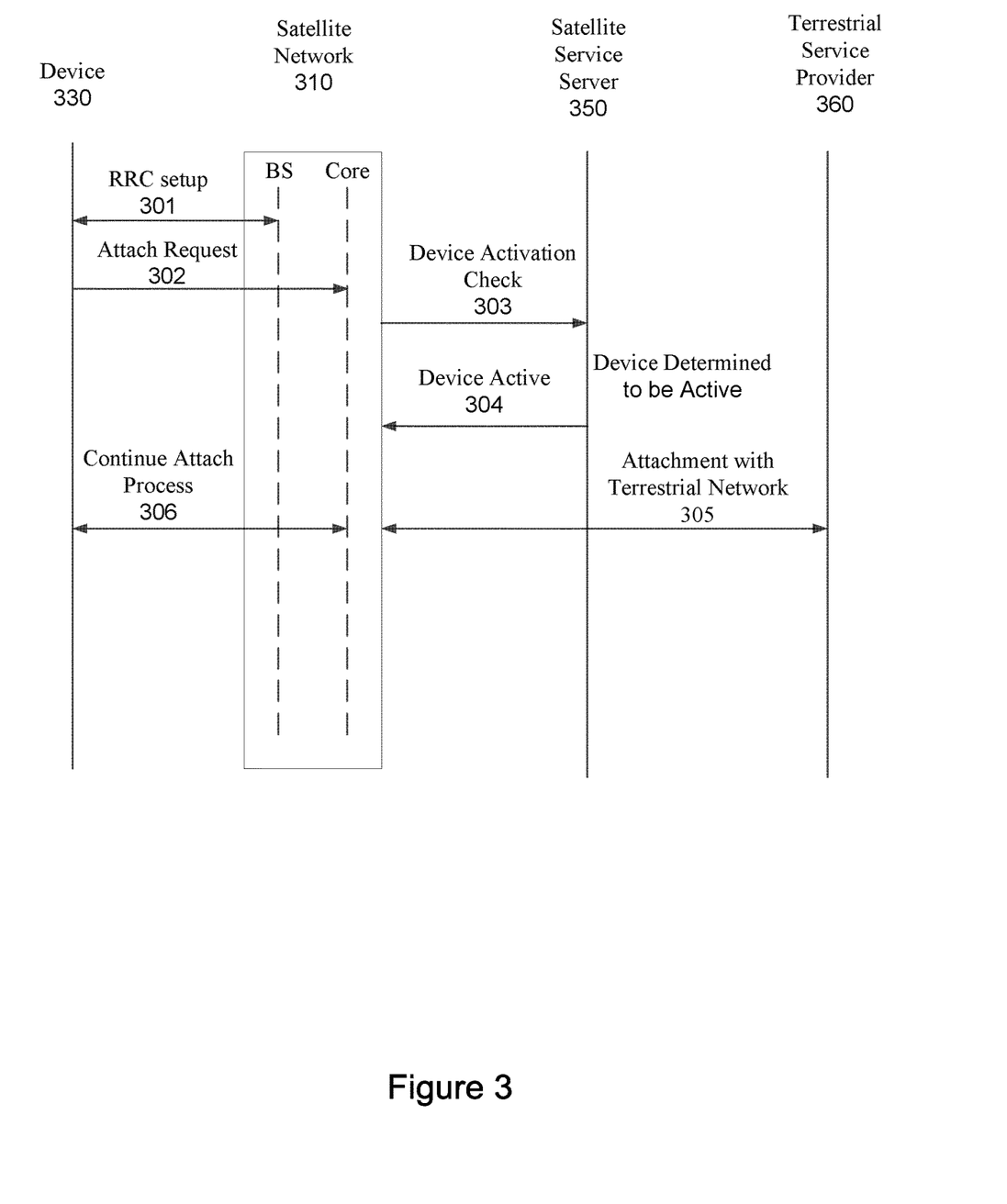
FIG. 3 shows a time-line of events in which a wireless device successfully attaches to the satellite network, according to an embodiment.

FIG. 3 shows a time-line of events in which a wireless device successfully attaches to the satellite network, according to an embodiment. A first event 301 includes a wireless device 330 completing an RRC (radio resource control) setup with a base station of a satellite network 310. A second event 302 includes the wireless device 330 sending an attachment request to the base station of the satellite network 310. A third event 303 includes the satellite network 310 performing an activation state check of the wireless device 330. That is, the satellite network 310 queries the satellite service server 350 to determine whether the wireless device 330 is an activated subscriber of the terrestrial service provider 360. If the wireless device 330 is determined to be an activated subscriber, then a fourth event 304 includes the satellite network 310 receiving the wireless device active status from the satellite service server 350. A fifth event 305 includes the satellite network 310 attaching with the terrestrial network 360. A sixth step 306 includes the satellite network 310 completing the attachment process with the wireless device 330.

For at least some embodiments, RRC connection setup includes a connection establishment process between base station of the satellite network 310 and the wireless device 330. A typical RRC connection establishment includes a prach (periodic random access channel also referred to as message 1) transmission by the wireless device 330. The base station responds with RAR (random access response, also referred to as message 2). The wireless device 330 then sends (transmits) an RRC connection request message (referred as message 3), and the base station sends (transmits) an RRC connection setup message (also referred to as message 4) to the wireless device 330. The wireless device then responds with an RRC connection complete message (message 5) to base station. As will be described, for some embodiments, the RRC connection setup message (also referred to as message 4) and the RRC connection complete message (message 5) may be eliminated when the wireless device is determined not to be activated.

Figure 4:
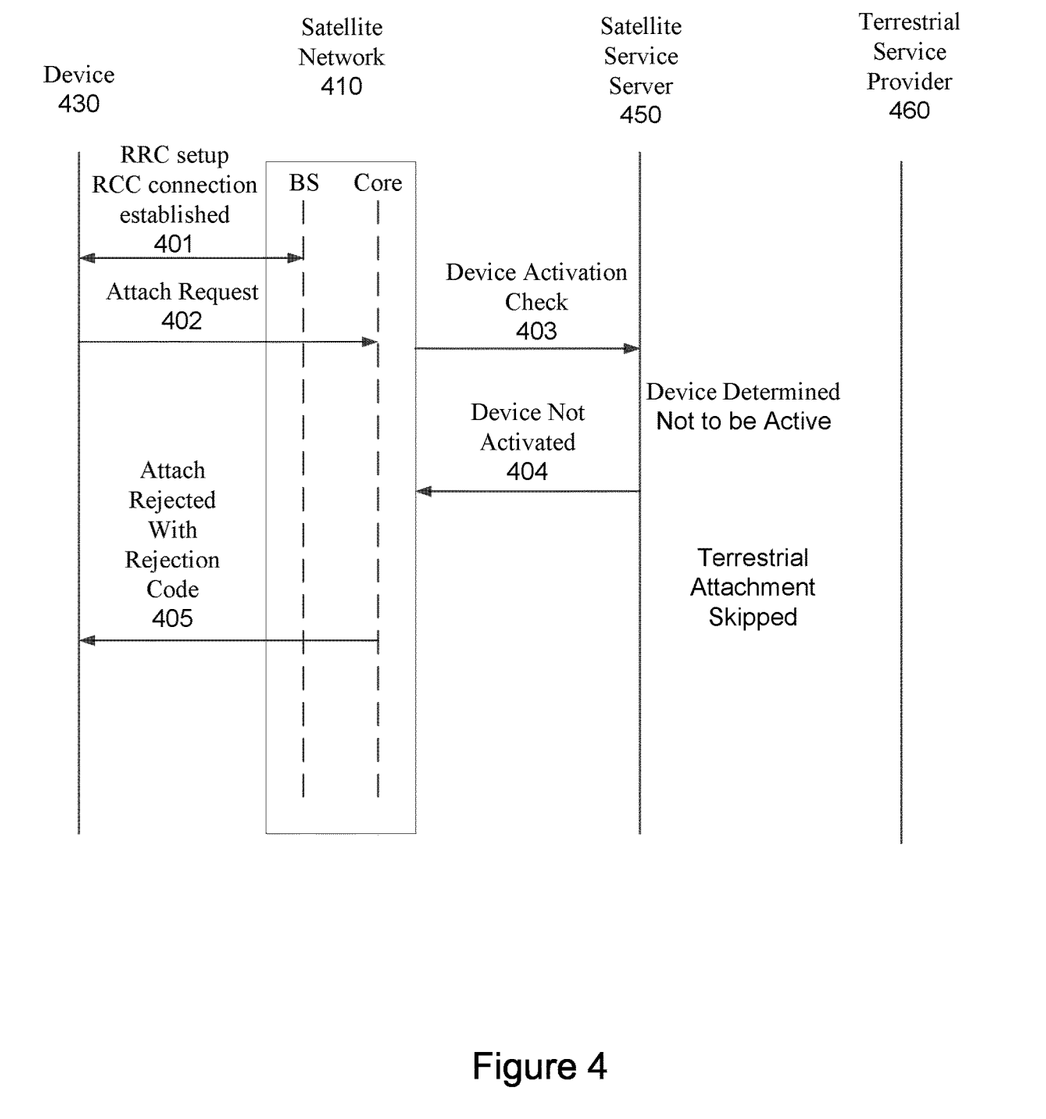
FIG. 4 shows a time-line of events in which an attachment request of a wireless device to the satellite network is rejected, according to an embodiment.

FIG. 4 shows a time-line of events in which an attachment request of a wireless device 430 to the satellite network 410 is rejected, according to an embodiment. A first event 401 includes a wireless device 430 completing an RRC (radio resource control) setup with a base station of a satellite network 410. A second event 402 includes the wireless device 430 sending an attachment request to the base station of the satellite network 410. A third event 403 includes the satellite network 410 performing an activation state check of the wireless device 430. That is, the satellite network 410 queries the satellite service server 450 to determine whether the wireless device 430 is an activated subscriber of the terrestrial service provider 460. If the wireless device 430 is determined to not be an active subscriber, then a fourth event 404 includes the satellite network 410 receiving the wireless device not-activated status from the satellite service server 450. Note that in this situation, the satellite network 410 does not perform attachment with the terrestrial network 460. A fifth step 405 includes the satellite network 410 sending an attachment rejection 405 to the wireless device 406 along with a rejection code.

Figure 5:
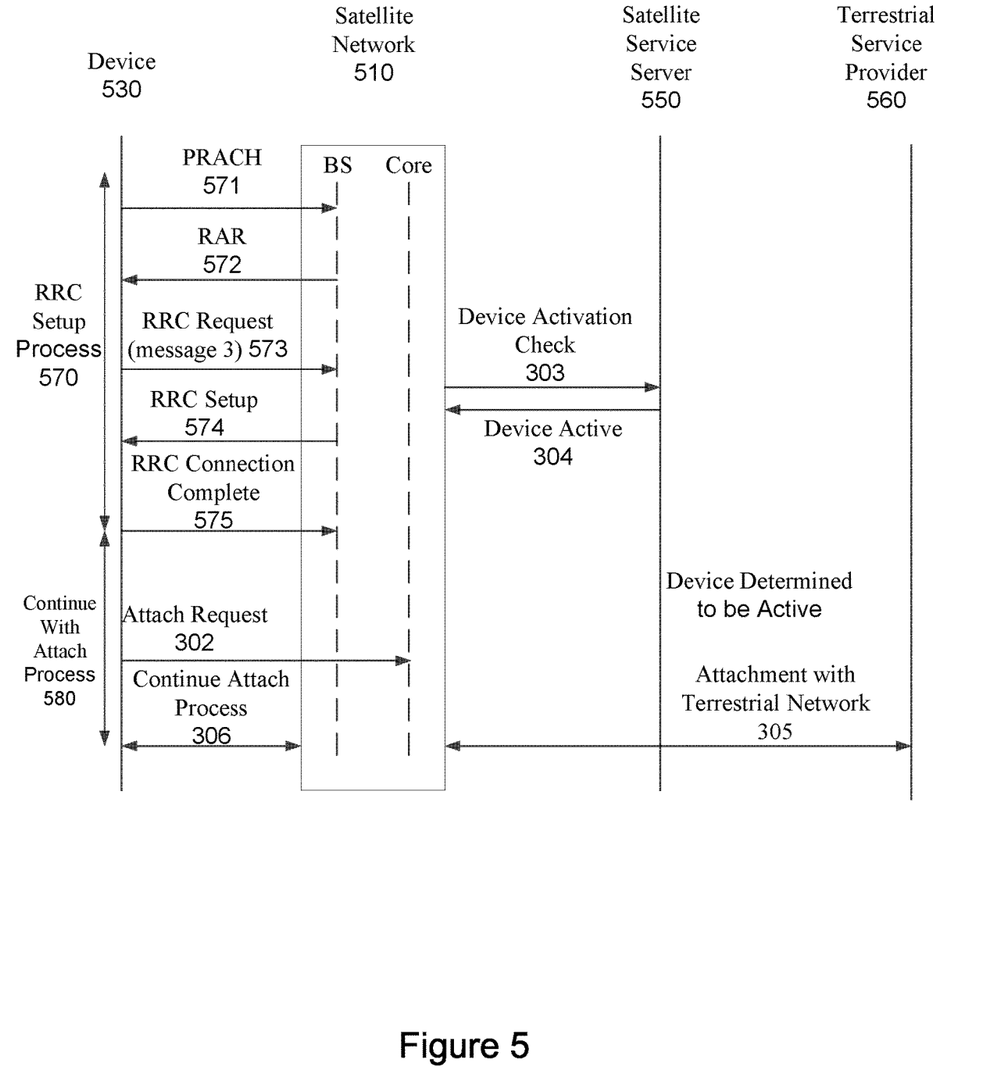
FIG. 5 shows a time-line of events of a passing early attachment check by a base station of a satellite network, according to an embodiment.

FIG. 5 shows a time-line of events of a passing early attachment check by a base station of a satellite network, according to an embodiment. This time-line includes an RRC setup process 570 and a wireless device attachment process 580. The embodiments of FIG. 5 and FIG. 6 include an early attachment check which reduces the impact on satellite resources during the wireless device connection (attachment) process. Specifically, through the novel RRC attachment process, determination is made earlier whether an attaching wireless device has been activated or not. If a wireless device is determined not to be activated, then several messages (574, 575, 302, 306) can be eliminated from being transmitted over the wireless satellite link between the wireless device and the base station of the satellite network, thereby reducing the impact on the valuable and scarce satellite connection resources.

A first event 571 includes the satellite network 510 receiving a PRACH (periodic random-access channel) request from the wireless device 530. A second event 572 includes the satellite network 510 replying with a RAR (random access response). A third step 573 includes the satellite network 510 receiving an RRC request (also referred to as "message 3") from the wireless device 530. Upon receiving the RRC request of step 573, the device activation check of step 303 is performed. If the wireless device is determined to be activated, the device active step 304 is received by the core of the satellite network. That is, upon receiving the RCC connection request of step 573 from the wireless device 530, the satellite network 51 sends a device activation check (query) 303 to the satellite server 550. If the wireless device 530 is determined to be a subscriber device, the satellite server 550 responds with an indicator (device active 304) that the wireless device is an active device.

A fourth step 574 includes the satellite network 510 sending an RRC setup back to the wireless device 530 after receiving the device active indication of step 304. A fifth step 575 includes the satellite network 510 receiving an RCC connection complete from the wireless device 530.

The wireless device then sends the attach request 302. The satellite network 510 then attaches with the terrestrial network 360. Finally, the satellite network 510 completes the attachment process 306 with the wireless device 530.

Figure 6:
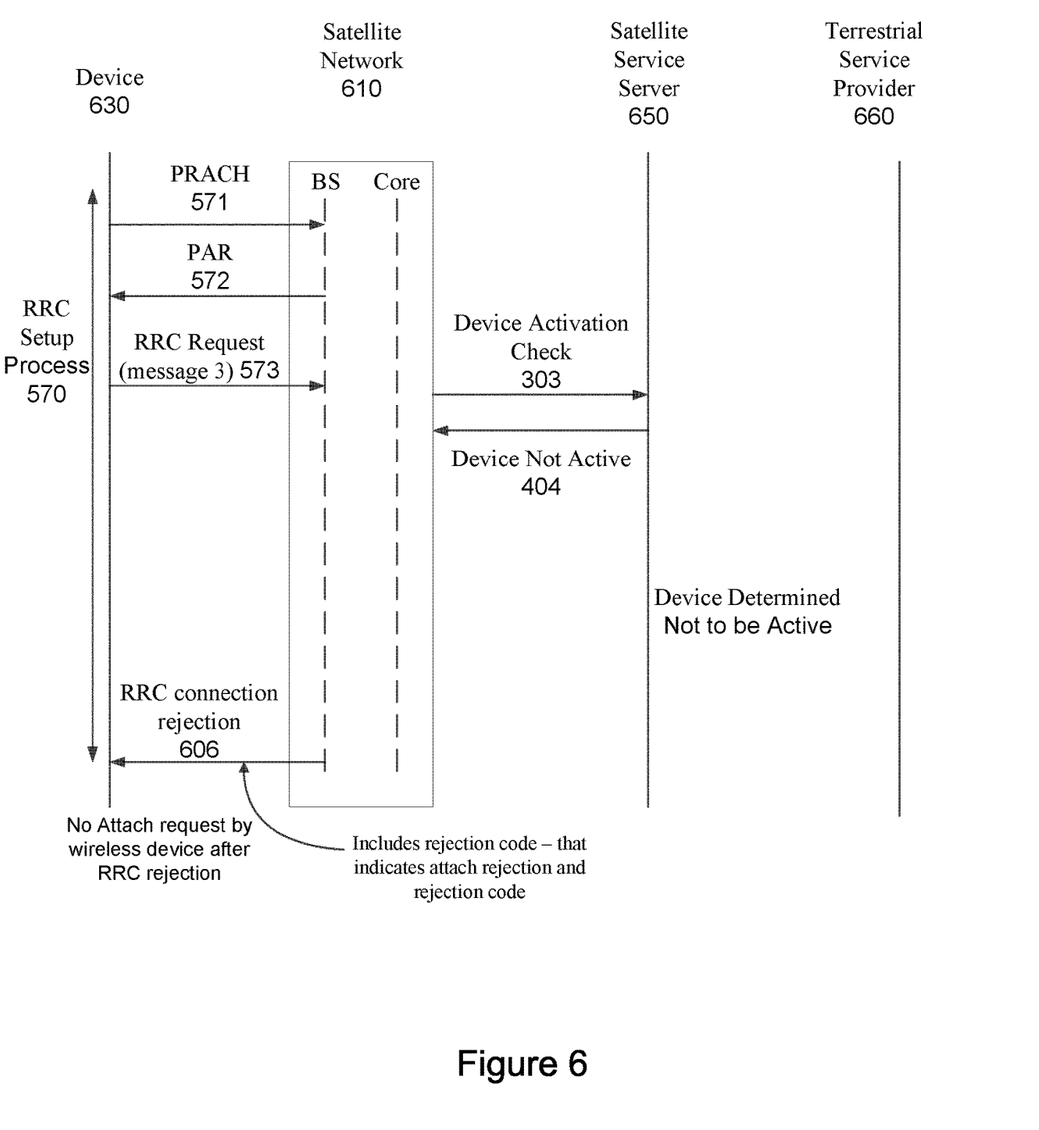
FIG. 6 shows a time-line of events of a failing early attachment check by a base station of a satellite network, according to an embodiment.

FIG. 6 shows a time-line of events of a failing early attachment check by a base station of a satellite network 610, according to an embodiment. Here, the RRC setup process 570 is the same as described for FIG. 5 except steps 574, 575 are not performed or executed if the wireless device is determined not to be active through step 404. Here, the attachment process includes the wireless device 630 being determined not to be an active device in response to the activation check 303 sent by the satellite network 610 to the satellite service server 650. The device not active status 404 is communicated to the satellite network 610. The satellite network 610 then communicates an RRC connection rejection 606 to the wireless device 630. Note that in this situation, the satellite network 610 does not perform attaching with the terrestrial network 660, and steps 302, 306, 574, 575 are not performed. The elimination of these steps is novel and saves satellite network resources (time and frequency allocations) of the wireless satellite link between the wireless device 330 and the base station of the satellite network 310.

As previously described, the embodiments of FIG. 5 and FIG. 6 include embodiments of an early attachment check which reduces the impact on satellite resources during the wireless device connection (attachment) process. Specifically, through the novel RRC attachment process, determination is made earlier whether an attaching wireless device has been activated or not. After step 573 that includes the RRC request (message 3), activation of the wireless device is checked through step 303. If the wireless device is determined not to be activated (step 404), then several messages (of steps 574, 575, 302, 306) can be eliminated from being transmitted over the wireless satellite link between the wireless device and the base station of the satellite network, thereby reducing the impact on the valuable and scarce satellite connection resources.

At least some embodiments further include sending, by the satellite network, a rejection code to the wireless device based upon the activation status of the wireless device in the satellite service server, wherein a retry procedure of the wireless device is based upon the rejection code. For an embodiment, the rejection code specifies a period of time (for example, 24 hours) during which the wireless device cannot retry another connection attempt. For an embodiment, if the wireless device has been determined to be stolen, damaged, or not operating within bounds the rejection code may permanently disable the wireless device. This may be done by deleting information from the SIM card such as PLMN (Public Land Mobile Network) ID.

Figure 7:
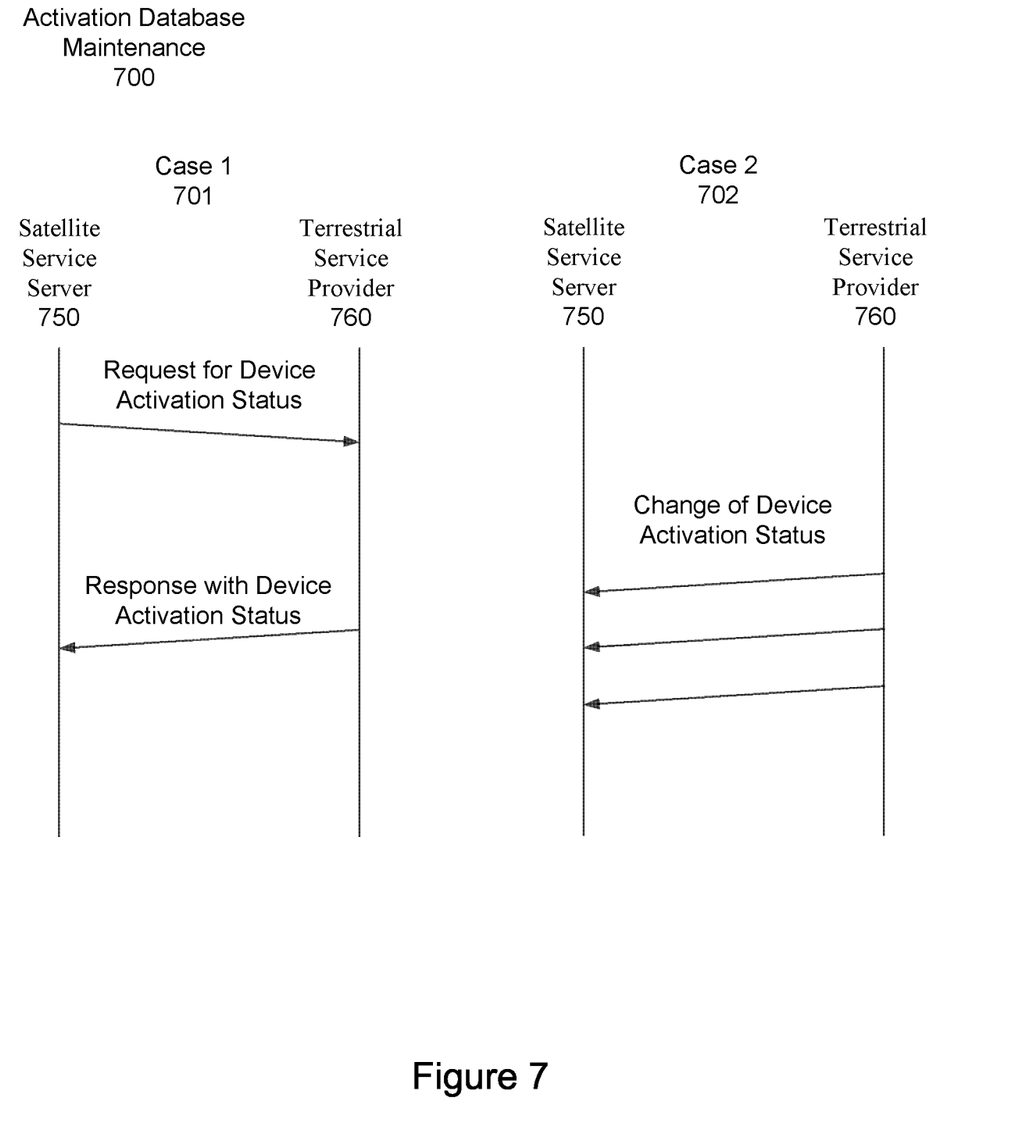
FIG. 7 shows a time-line of events of two different cases of maintaining activation statuses of subscriber devices, according to an embodiment.

FIG. 7 shows a time-line of events of two different cases 701, 702 of maintaining activation statuses of subscriber devices, according to an embodiment. For the first case 701, the satellite service server 750 submits a request for the activation status of a connecting wireless device. The terrestrial service provider 760 responds with the activation status which is then stored in the database of the terrestrial service provider 760.

For the second case, the terrestrial service provider 760 continually provides the activation/deactivation status of each of the subscriber devices over time to the satellite service server 750.

Figure 8:
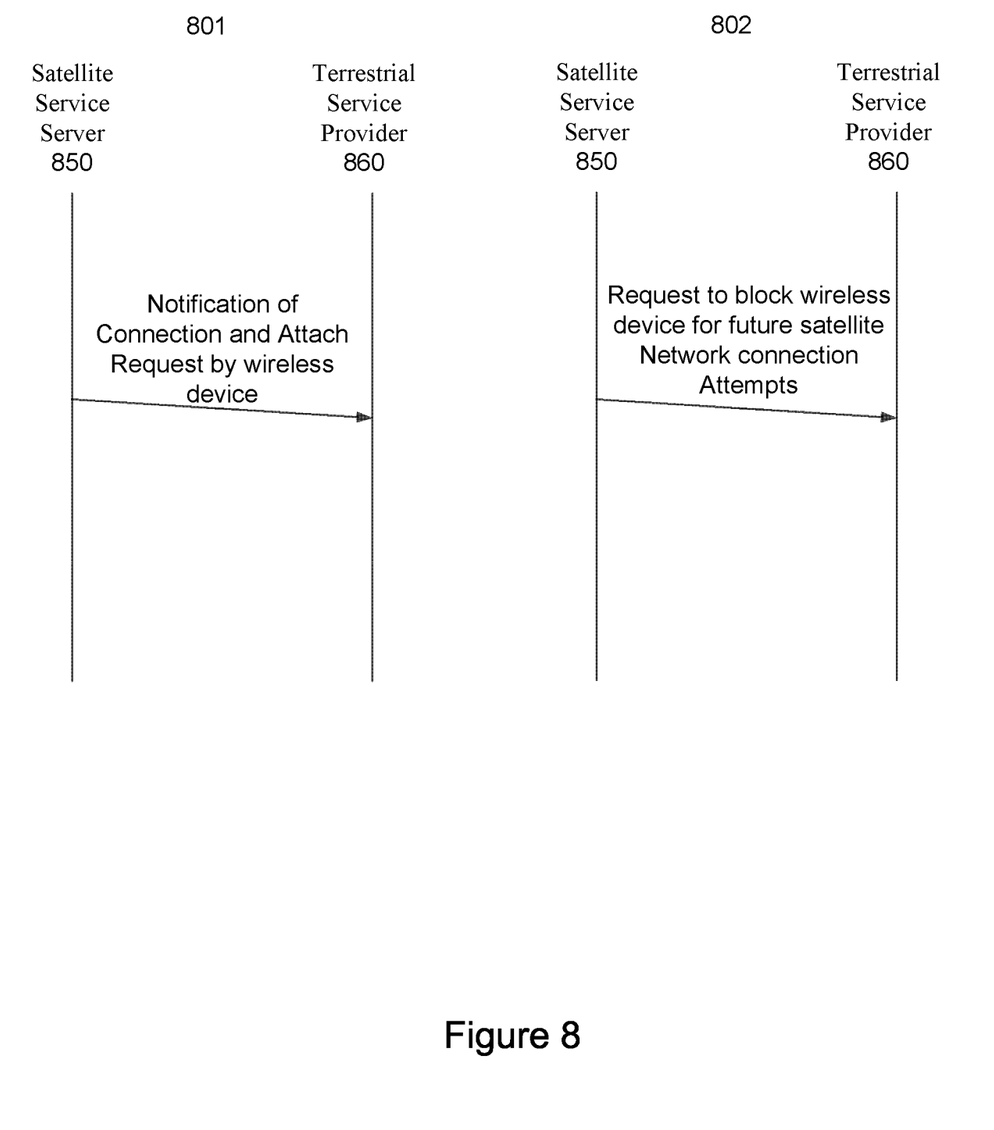
FIG. 8 shows a time-line of events of a satellite service server tracking activation attempts by a wireless device, and further, requesting to block the wireless device after a set number of activation check failures, according to an embodiment.

FIG. 8 shows a time-line of events of a satellite service server 850 tracking activation attempts by a wireless device, and further, requesting to block the wireless device after a set number of activation check failures, according to an embodiment. For at least some embodiments, this enables the satellite network (through the satellite service server 850) to notify the terrestrial network (through the terrestrial service provider 860) that a wireless device is making excessive demands on the satellite network by repeatedly requesting connection despite being inactive or otherwise not eligible to use the satellite network. Process 801 shows the satellite service server 850 providing the terrestrial service provider 860 with notification of connection and attachment requests by the wireless device. Process 802 shows the terrestrial service provider 860 providing a request or instructions to the satellite service provider 850 to block the wireless device for future satellite network connections. The block for be for any number of future attempts by the wireless device or for any selected amount of time.

Figure 9:
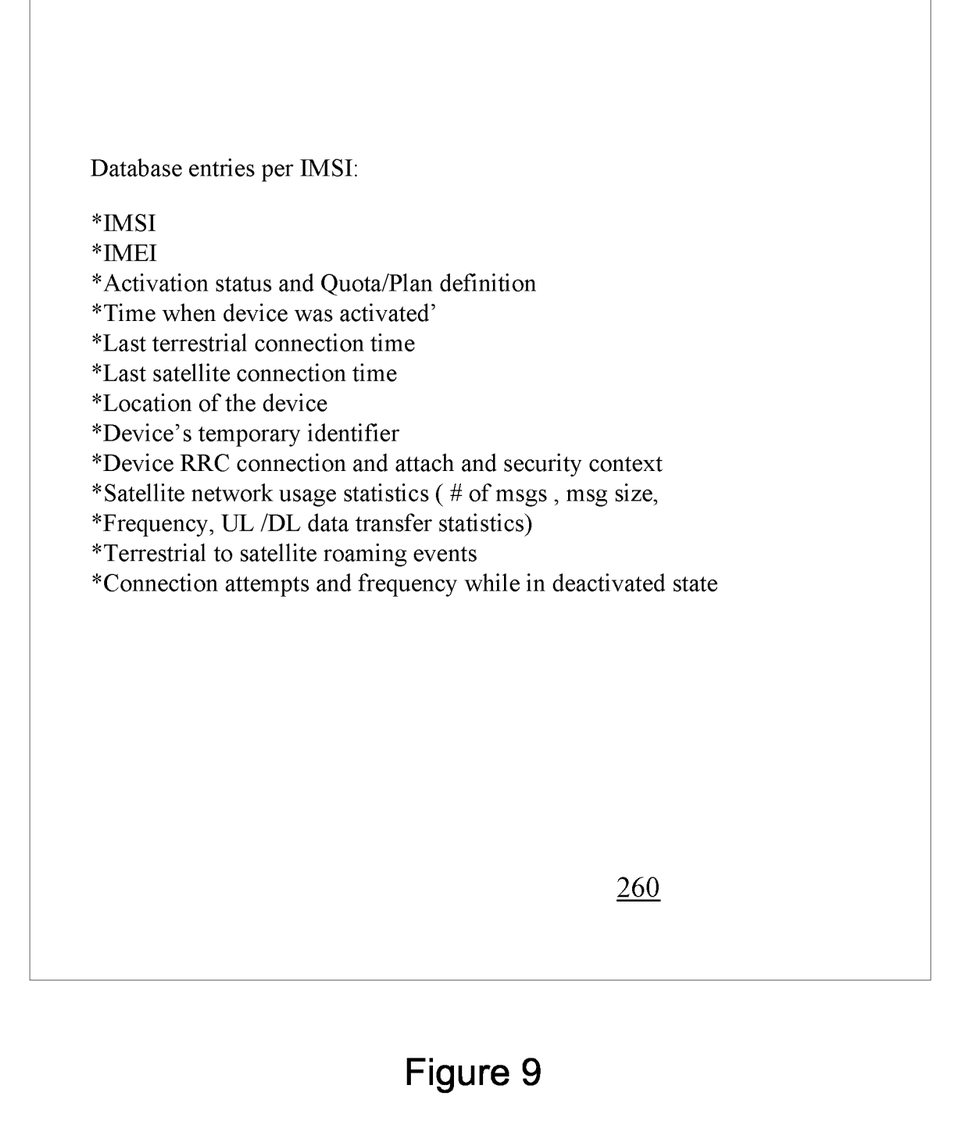
FIG. 9 is a table that includes exemplary entries in a database of the satellite service server, according to an embodiment.

FIG. 9 is a table that includes exemplary entries in a database 260 of the satellite service server, according to an embodiment. Exemplary entries to the database 260 include an IMSI (international mobile subscriber identity) of the customer device, IMEI. activation status and Quota/Plan definition, 'Time when device was activated', last terrestrial connection time. last satellite connection time, location of the device, device's temporary identifier, device RRC connection and attach and security context, satellite network usage statistics (#of msgs, msg size, Frequency, UL/DL data transfer statistics). terrestrial to satellite roaming events, connection attempts and frequency while in deactivated state. The maintenance of such a database (table) external to the core of the satellite network is unique to existing satellite networks.

Figure 10:
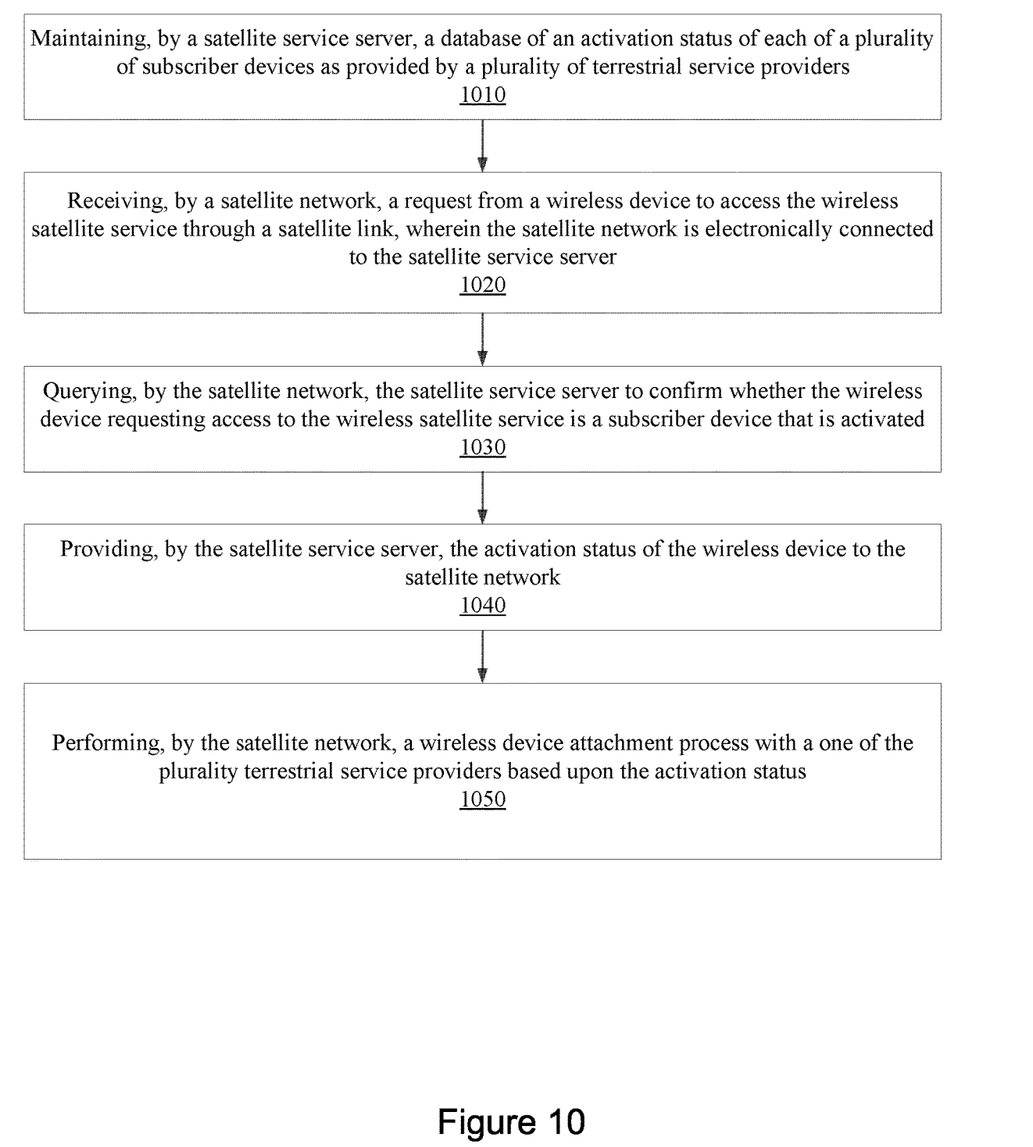
FIG. 10 is a flow chart that includes steps of a method for wireless device activation tracking of a wireless satellite service.

FIG. 10 is a flow chart that includes steps of a method for wireless device activation tracking of a wireless satellite service. A first step 1010 includes maintaining, by a satellite service server, a database of an activation status of each of a plurality of subscriber devices as provided by a plurality of terrestrial service providers. A second step 1020 receiving, by a satellite network, a request from a wireless device to access the wireless satellite service through a satellite link, wherein the satellite network is electronically connected to the satellite service server. A third step 1030 querying, by the satellite network, the satellite service server to confirm whether the wireless device requesting access to the wireless satellite service is a subscriber device that is activated. A fourth step 1040 includes providing, by the satellite service server, the activation status of the wireless device to the satellite network. A first step 1050 includes performing, by the satellite network, a wireless device attachment process with a one of the plurality terrestrial service providers based upon the activation status.

As previously described, satellite wireless links are a scarce resource. That is, there is only a limited amount of frequency spectrum allocated for use by the satellite links. Accordingly, it can be desirable to only let devices of paid customers (subscribers) to access the wireless satellite service. For an embodiment, customers may purchase the subscription of the wireless satellite service as insurance in case needed but may not be needed. For an embodiment, wireless devices of non-prepaid users (non-customers) are not allowed to have access to the wireless satellite service.

Further, as previously described, for an embodiment, the wireless device attachment process refers to satellite network attachment which includes authentication, security, device capability, and configuration message exchange between the wireless device 130 and the satellite network 140. For an embodiment, when the wireless device roams to the satellite network 140, the satellite network 140 may authenticate with at least one of the terrestrial networks 110, 120.

For an embodiment, the activation process includes checking the device's billing, registration and certification status (can include more checks) of the wireless device and determining whether the wireless device is allowed to access the satellite network or not. As previously described, the satellite network includes a satellite base station and a satellite core network.

At least some embodiments further include receiving, by the satellite service server, activation status change notifications from the plurality of terrestrial service providers indicating when a subscriber device subscription to the wireless satellite service is activated or deactivated. The database of the activation status of each of a plurality of subscriber devices as provided by a plurality of terrestrial service providers can be accordingly updated.

At least some embodiments further include performing, by the satellite network, an authentication with at least one of the plurality of the terrestrial service providers for the wireless device during the attachment process as shown in FIG. 3.

At least some embodiments further include rejecting, by the satellite network, the access request of the wireless device when the satellite service server returns a non-active status when queried by the satellite network as shown in FIG. 4. For an embodiment, this is a case in which there is a failure in response to the first authentication attempt. As previously described, at least some embodiments further include sending, by the satellite network, a rejection code to the wireless device based upon the activation status of the wireless device in the satellite service server, wherein a retry procedure of the wireless device is based upon the rejection code. For an embodiment, the rejection code specifies a period of time (for example, 24 hours) in which the wireless device cannot retry another connection attempt. For an embodiment, if the wireless device has been determined to be stolen, damaged, or not operating within bounds the rejection code may permanently disable the wireless device. This may be done by deleting information from the SIM card such as PLMN (Public Land Mobile Network) ID.

At least some embodiments further include sending, by the wireless satellite service, a message to the wireless device providing information about the activation of the wireless device in the satellite service server. For an embodiment, the message includes information about a data quota of the wireless device and whether the data quota is about to expire. For an embodiment, the message includes information indicating that the wireless device is inactive and that only emergency services will work. For an embodiment, the message includes information indicating that the wireless device is roaming into a region where service cannot be provided. For example, the wireless device may have purchased only European coverage, and is now located in the United States. For an embodiment the message may be contained inside the network rejection code.

At least some embodiments further include granting network access by the satellite network to the wireless device for on a limited basis based upon the rejection code. For an embodiment, the limited basis includes granting access for a limited time duration. For an embodiment, the limited basis includes granting access for a limited set of services/messages. For an embodiment, the limited basis includes granting access for a limited set of service locations. The described embodiment of the limited basis can have variations (such as, the variable time) that can be selected, for example, per policy of satellite network provider or legal requirements (for example, might be required to provide SOS).

At least some embodiments further include sending, by a satellite core network of the satellite network, a message to the wireless device through a terrestrial wireless network based upon the rejection code. Sending the message to the wireless device through the terrestrial network reduces messaging over the wireless satellite link and is generally more cost effective. Accordingly, the message can include more detail than a short terse message sent over the satellite wireless link. For at least some embodiments, the message includes further elaboration of why a rejection was given. Further, for an embodiment, the message may include a solicitation for service reactivation. Further, for an embodiment, the message may include a control command to the device to engage in a different mode of operation. These messages may be sent at both current and future times.

At least some embodiments further include receiving, by the satellite network, identification information (such as, IMSI (international mobile subscriber identity)) from the wireless device. For an embodiment, the identification information is received by the satellite network from the wireless device during a radio resource control connection (RRC) process. For an embodiment, the RRC is a connection process a wireless device makes with a base station. For an embodiment, network attachment and authentication is a process the wireless device makes with a core network that comes after the RRC connection process has successfully concluded, and the attach process uses the RRC connection that was established.

At least some embodiments further include sending, by the satellite network a rejection code to the wireless device based upon the activation status of the wireless device in the satellite service server and rejecting the radio resource connection of the wireless device based upon the activation status of the wireless device as stored in the database of the satellite service server.

At least some embodiments further include authenticating, by the satellite network, with at least one of the plurality of terrestrial service providers based on an activation status of the wireless device maintained by the database. At least some embodiments further include authenticating based on the identification information (IMSI and other) provided by the wireless device during the authentication process. This is a success for the first authentication, and now doing 2nd authentication with the partner terrestrial network by the satellite network. As previously described, the opportunity to reject the request earlier in the process allows for preservation scarce satellite channel resource by not sending RRC setup (574 of FIG. 5), RRC connection complete (575 of FIG. 5), attach request (302 of FIG. 3), and attach rejection (406 of FIG. 4) messages.

At least some embodiments further include allowing, by the satellite network, the wireless device to access a network of the wireless satellite service after receiving an authentication response from at least one of the plurality of terrestrial service providers. This includes a pass double authentication.

At least some embodiments further include allowing, by the satellite network, the wireless device to access a network of the wireless satellite service after receiving an activation status response from the satellite service server. This includes a pass, null authentication case.

For an embodiment, the wireless device requesting access to the wireless satellite service has a device ID (IMSI (international mobile subscriber identity)) that is not an ID of the wireless satellite service, thereby requiring the satellite service server to track and authenticate the wireless device. For an embodiment, some device IDs belong to the satellite service provider, and some belong (owned, issued by, etc.) to the plurality of terrestrial service providers.

For an embodiment, the wireless device requesting access to the wireless satellite service has a device ID (IMSI) that is an ID of the wireless satellite service and is programmed into a SIM (Subscriber Identity Module) card of the wireless device.

For an embodiment, the satellite service server further contains data quota information for roaming wireless devices, wherein roaming devices are wireless devices that roam from a terrestrial network to the satellite network. For an embodiment, the quota information includes a data quota received from the terrestrial network. For an embodiment, the satellite network operates to reject or accept requests from wireless devices based on the data quota. For an embodiment, a rejection may include a sleep reject based on a quota scheme. For at least some embodiments, the wireless satellite service normally does not know what service plan a wireless device has if it is provided by a terrestrial network. However, the terrestrial network can provide some of this information to the satellite service server and the wireless satellite service can make more informed decisions based upon this information.

For an embodiment, the satellite service server maintains a count of the number of access attempts from a wireless device. For an embodiment, a core network of the satellite network sends a rejection code to the wireless device through a terrestrial network based upon the authentication attempt count.

For an embodiment, the satellite service server further contains security features for roaming wireless devices. For an embodiment, the security features are received from the terrestrial network. For an embodiment, the satellite network rejects or accepts an access request by a wireless device based on the security features.

For an embodiment, the satellite service server further contains location information for roaming wireless devices. For an embodiment, the location information is received from the terrestrial network. For an embodiment, the satellite network rejects or accepts an access request by a wireless device based on the location information.

An alternative embodiment includes the steps of the method for wireless device activation tracking of a wireless satellite service from the perspective of the satellite service server. Specifically, for an embodiment, the method includes maintaining, by a satellite service server, a database of an activation status of each of a plurality of subscriber devices as provided by a plurality of terrestrial service providers, wherein a satellite network receives a request from a wireless device to access the wireless satellite service through a satellite link, wherein the satellite network is electronically connected to the satellite service server. Further, the method includes receiving, by the satellite service server, a querying from the satellite network to confirm whether the wireless device requesting access to the wireless satellite service is a subscriber device that is activated, and providing, by the satellite service server, the activation status of the wireless device to the satellite network, wherein the satellite network performs a wireless device attachment process with a one of the plurality terrestrial service providers based upon the activation status.

Although specific embodiments have been described and illustrated, the embodiments are not to be limited to the specific forms or arrangements of parts so described and illustrated. The described embodiments are to only be limited by the claims.

What is claimed:

1. A method of operating a wireless satellite service, comprising:
    maintaining, by a satellite service server, a database of an activation status of each of a plurality of subscriber devices as provided by a plurality of terrestrial service providers;
    receiving, by a satellite network, a request from a wireless device to access the wireless satellite service through a satellite link, wherein the satellite network is electronically connected to the satellite service server, comprising
        receiving, by the satellite network, a PRACH (periodic random-access channel) request from the wireless device;
        replying, by the satellite network, with a RAR (random access response);
        receiving, by the satellite network, an RRC (radio resource control) request from the wireless device;
    querying, by the satellite network, the satellite service server to confirm whether the wireless device requesting access to the wireless satellite service is a subscriber device that is activated upon receiving the RRC request, comprising:
        sending, by the satellite network, a device activation check (query) to the satellite server;
        providing, by the satellite service server, the activation status of the wireless device to the satellite network;
    responding, by the satellite network, with an indicator that the wireless device is an active device when the wireless device is determined to be a subscriber device, comprising:
        a. sending, by the satellite network, an RRC setup back to the wireless device after receiving the device active indication;
        b. receiving, by the satellite network, an RCC connection complete from the wireless device;
    responding, by the satellite network, with a device not active indicator when the wireless device is determined not to be a subscriber device, thereby bypassing steps a and b to reduce an impact on satellite connection resources when responding with the device not active indicator.

2. The method of claim 1, wherein the satellite network includes a satellite base station and a satellite core network.

3. The method of claim 1, further comprising:
    receiving, by the satellite service server, activation status change notifications from the plurality of terrestrial service providers indicating when a subscriber device subscription to the wireless satellite service is activated or deactivated.

4. The method of claim 1, further comprising performing, by the satellite network, an authentication with at least one of the plurality of the terrestrial service providers for the wireless device during an attachment process.

5. The method of claim 1, further comprising;
    rejecting, by the satellite network, the access request of the wireless device when the satellite service server returns a non-active status when queried by the satellite network.

6. The method of claim 5, further comprising:
    sending, by the satellite network, a rejection code to the wireless device based upon the activation status of the wireless device in the satellite service server, wherein a retry procedure of the wireless device is based upon the rejection code.

7. The method of claim 1, further comprising sending, by the wireless satellite service, a message to the wireless device providing information about the activation of the wireless device in the satellite service server.

8. The method of claim 6, further comprising granting network access by the satellite network to the wireless device for on a limited basis, wherein the rejection code specifies a period of time during which the wireless device cannot retry another connection attempt.

9. The method of claim 6, further comprising sending, by a satellite core network of the satellite network, a message to the wireless device through a terrestrial wireless network based upon the rejection code, wherein the message sent through the terrestrial network includes more detail than a message sent through the satellite network.

10. The method of claim 6, wherein the message sent through the terrestrial network includes a control command to the wireless device to engage in a different mode of operation.

11. The method of claim 10, further comprising:
sending, by the satellite network a rejection code to the wireless device based upon the activation status of the wireless device in the satellite service server;
rejecting the radio resource connection of the wireless device based upon the activation status of the wireless device as stored in the database of the satellite service server.

12. The method of claim 10, further comprising:
authenticating, by the satellite network, with at least one of the plurality of terrestrial service providers based on an activation status of the wireless device maintained by the database.

13. The method of claim 4, further comprising:
allowing, by the satellite network, the wireless device to access a network of the wireless satellite service after receiving an authentication response from the satellite service server.

14. The method of claim 1, further comprising:
allowing, by the satellite network, the wireless device to access a network of the wireless satellite service after receiving an activation status response from the satellite service server.

15. The method of claim 1, wherein the wireless device requesting access to the wireless satellite service has a device ID (IMSI (international mobile subscriber identity)) that is not an ID of the wireless satellite service, thereby requiring the satellite service server to track and authenticate the wireless device.

16. The method of claim 1, wherein the wireless device requesting access to the wireless satellite service has a device ID (IMSI) that is an ID of the wireless satellite service and is programmed into a SIM (Subscriber Identity Module) card of the wireless device.

17. The method of claim 8 1, wherein the limited basis further includes granting access for a limited set of service locations.

18. The method of claim 1, wherein the satellite service server maintains a count of the number of authentication attempts from a wireless device.

19. A satellite system, comprising:
a satellite network;
a satellite service server electronically connected to the satellite network;
the satellite service server configured to:
maintain a database of an activation status of each of a plurality of subscriber devices as provided by a plurality of terrestrial service providers; satellite network configured to:
receive a request from a wireless device to access the wireless satellite service through a satellite link, wherein the satellite network is electronically connected to the satellite service server, comprising satellite network operating to:
receive a PRACH (periodic random-access channel) request from the wireless device;
reply with a RAR (random access response);
receive an RRC (radio resource control) request from the wireless device;
query the satellite service server to confirm whether the wireless device requesting access to the wireless satellite service is a subscriber device that is activated upon receiving the RRC request, comprising satellite network operating to:
send a device activation check (query) to the satellite server;
the satellite service server further configured to:
provide the activation status of the wireless device to the satellite network;
respond with an indicator that the wireless device is an active device when the wireless device is determined to be a subscriber device, comprising satellite network operating to:
a. send an RRC setup back to the wireless device after receiving the device active indication;
b. receive an RCC connection complete from the wireless device;
respond with a device not active indicator when the wireless device is determined not to be a subscriber device, thereby bypassing steps a and b to reduce an impact on satellite connection resources when responding with the device not active indicator.

20. The satellite system of claim 19, wherein a core network of the satellite network sends the rejection code to the wireless device through a terrestrial network based upon the authentication attempt count.

* * * * *